Feb. 4, 1930.     M. KNIGHT     1,745,372
AUTOMOBILE SIGNAL
Filed Dec. 12, 1928     3 Sheets-Sheet 1

Inventor
Merle Knight
By Clarence A. O'Brien
Attorney

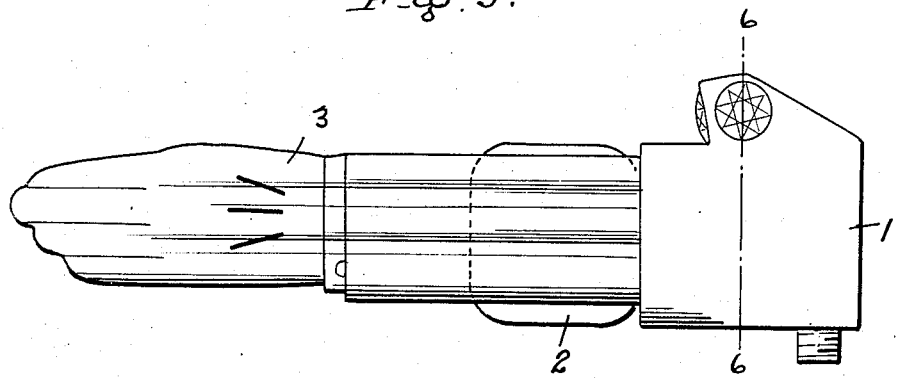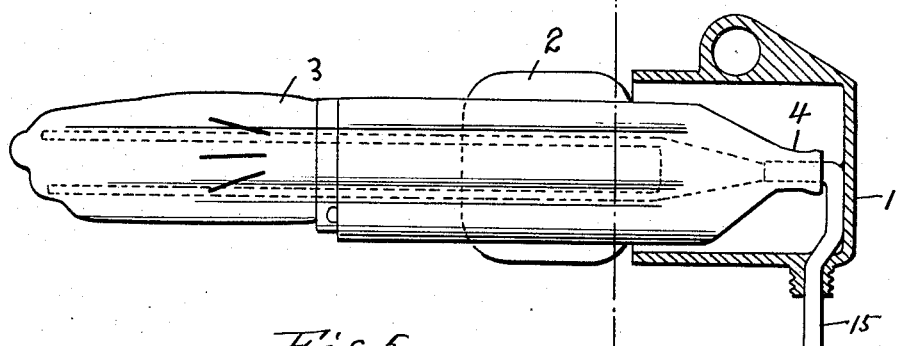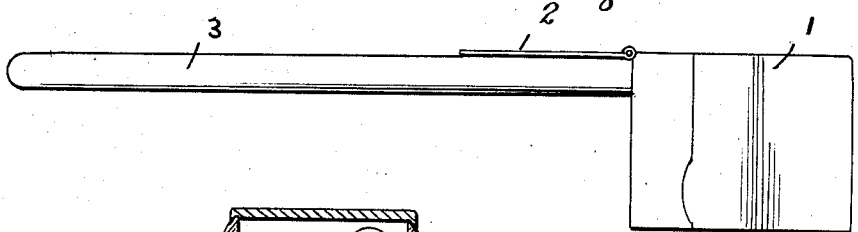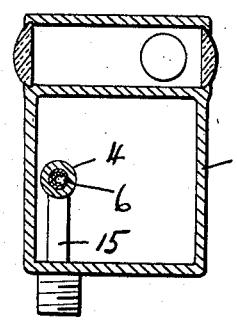

Feb. 4, 1930.  M. KNIGHT  1,745,372
AUTOMOBILE SIGNAL
Filed Dec. 12, 1928  3 Sheets-Sheet 3
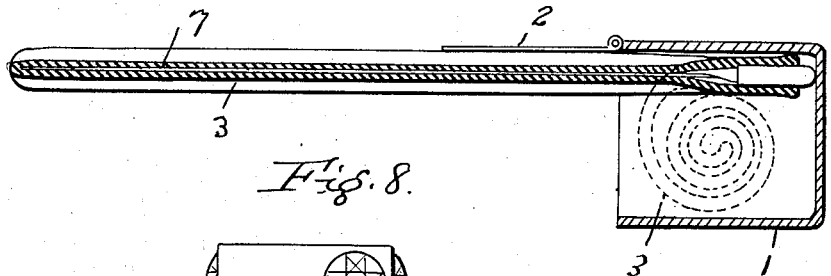
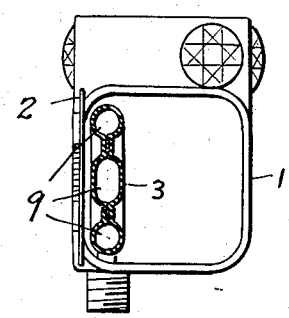
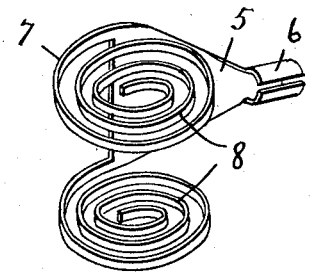
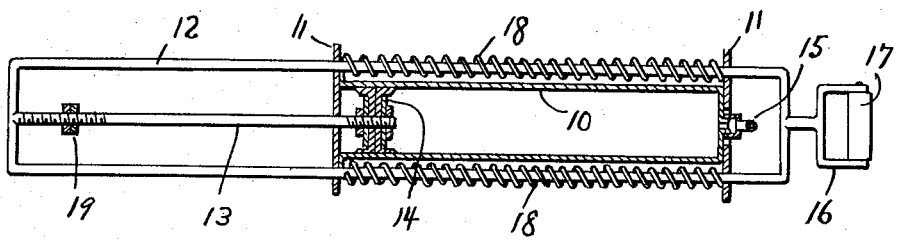
Inventor
Merle Knight
By Clarence A. O'Brien
Attorney Patented Feb. 4, 1930

1,745,372

UNITED STATES PATENT OFFICE

MERLE KNIGHT, OF FLINT, MICHIGAN

AUTOMOBILE SIGNAL

Application filed December 12, 1928. Serial No. 325,472.

Broadly, this invention pertains to improvements in signals and more specifically the same has reference to a mechanical signalling device especially adapted for use on automobiles for indicating to nearby persons which direction the driver intends to turn.

In recent years devices of this character have come into existence in considerable numbers, and while these devices in practically every respect accomplish the results contemplated, they are not all practical from the standpoint of economy and durability.

The present invention briefly consists of a container mounted on the side of a vehicle with a fluid extensible structure normally collapsed within the container and which may be extended beyond the confines of the container by actuating the compressor located adjacent the driver.

Among the numerous objects of the invention is to provide a signal device of this character which will be positive in operation, durable in use and wherein the parts may be easily disconnected for the purpose of repair or replacement.

In the drawings:

Figure 1 fragmentarily represents in side elevation the front portion of a conventional automobile equipped with the improved signal.

Figure 3 is a side elevation of the indicating portion of the present invention showing the signalling element in extended position.

Figure 4 represents a sectional view through the container in which the signalling element is normally collapsed, but which in this view is shown extended.

Figure 5 is a top plan view of the indicating portion of the present invention.

Figure 6 is a cross sectional view through the indicating portion of the invention taken substantially on line 6—6 of Figure 3.

Figure 7 represents a longitudinal sectional view through the indicating portion of the invention with the signalling element in extended position.

Figure 8 is a cross sectional view of the indicating portion of the invention taken substantially on line 8—8 of Figure 4.

Figure 9 is a perspective view of the spring structure employed in the construction of the indicating element.

Figure 10 is a top plan view in partial longitudinal section showing the compressor structure inclusive of the present invention.

Figure 1:
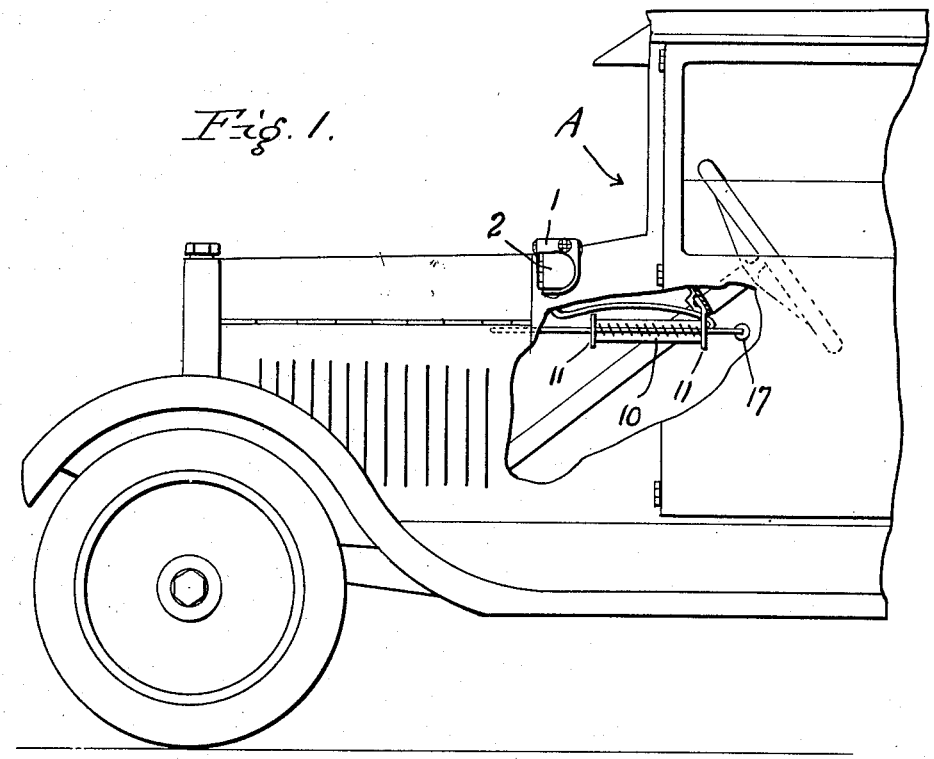
Figure 2:
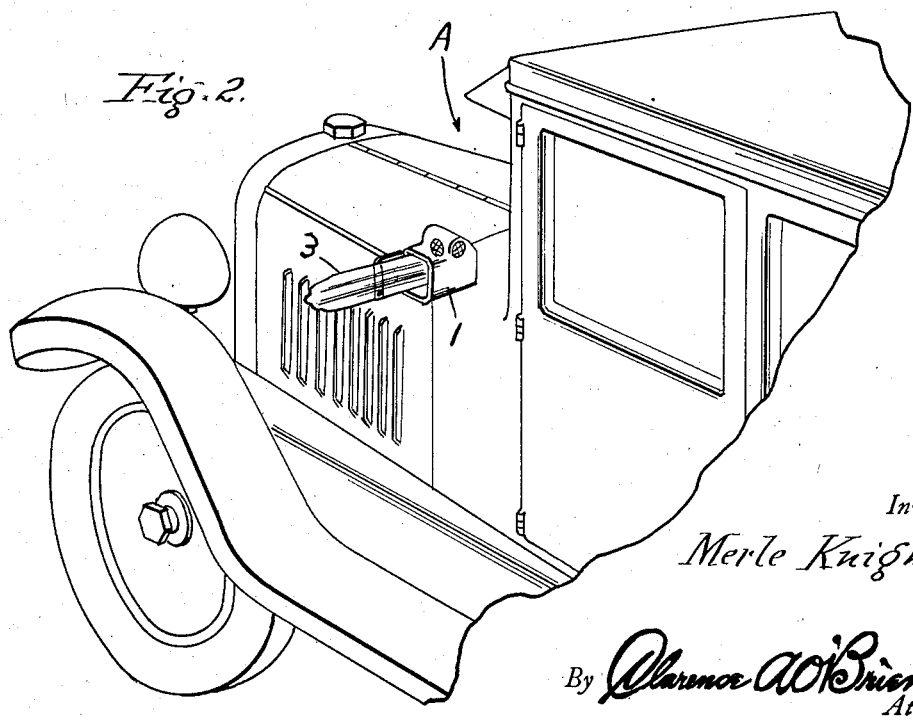
Figure 2 is a fragmentary perspective view of the front portion of an automobile equipped with the present invention which is shown with its signal element in extended position.

Referring to the drawings wherein like numerals designate like parts, a conventional automobile is generally referred to by A, and the present invention includes a container 1 open at one side and adapted to be mounted on the left upper side portion of the cowl of the vehicle body.

The open side of this container is provided with a closure 2 which is normally maintained closed by a suitable spring hinge structure (not shown in the drawings).

The invention includes a signalling element in the form of an elongated body 3 of suitable resilient material, such for example as rubber. One end portion of the body is constricted to provide a nipple 4, while the opposite end portion of the body is shaped to simulate a human hand. The body is hollow throughout its entire extent as is apparent from the Figure 8.

The spring structure shown in Figure 9 is adapted to be mounted within the body 3 and slightly inwardly from the constricted portion 4. This structure consists of a triangularly shaped plate 5 provided at its apex with a split tubular extension 6. From the base edge of the plate 5 a pair of elongated strips 7 project and are shaped to provide spring coils 8—8. The tubular extension 6 engages within the nipple 4, while the strips 7 extend longitudinally within the hollow body 3. The side walls of the body 3 are brought together and secured against the opposite sides of the respective strip 7 to provide three longitudinally extending air pockets 9. The tensional nature of the coils 8—8 will normally maintain the body 3 coiled within the container 1 in substantially the manner shown by dotted lines in Figure 7.

Referring now to Figure 10 the compressor structure which is inclusive of the present invention consists of a cylinder 10 located between a pair of supporting plates 11—11. These plates are formed with openings at opposite sides of the cylinder 10 to slidably receive an elongated substantially rectangular frame 12.

Extending inwardly from one end portion of the frame is a rod 13 provided at its end with a piston structure 14. This piston is operable within the cylinder 10 for compressing air through the tube 15 to the hollow body 3. The opposite end of the frame is provided with a yoke extension 16 within which a handle 17 is mounted. The coiled spring is convoluted on each longitudinal side portion of the frame between the supporting plates 11—11 for maintaining the frame urged forwardly so that the piston 14 will always be in a position to permit the ready operation thereof to compress air to the tube 15. A stop member 19 is threadable on the rod 13 to limit the inward movement of the piston to the extent desired.

It will thus be seen that by pulling rearwardly on the handle 17, the frame will move likewise and result in the compression of air within the cylinder 10 which will effect a discharge through the tube 15. The pressure of the air ejected into the hollow body 3 will in the instant extension thereof through the open side of the container 1 to assume the rigid position shown in the drawings. Thus the driver may indicate to nearby persons his intent to make a turn. Furthermore, by releasing the handle 17 the strings 18 will move the piston forwardly and create a suction within the chamber. This will result in a quick evacuation of the hollow body 3 and a consequential retraction thereof by the tensional action of the coiled spring 8—8.

Having thus described the invention, what I claim as new and desire to secure by Letters Patent is:—

1. A signal comprising, in combination, a container, a hollow resilient body normally coiled within said container, fluid compressing means connected with said body for extending said body from the container, said fluid compressing means consisting of a cylinder, and an elongated rectangular slide frame, a handle at one end of the frame, and a piston carried by the opposite end of the frame and being operable within the cylinder.

2. A signal comprising a support, an elongated inflatable body on said support, said body being normally disposed in collapsed position and adapted for horizontal disposition when inflated, and a spring for rapidly returning the body to collapsed position upon deflation, said spring consisting of a plate with a pair of normally coiled spring arms projecting therefrom, each disposed longitudinally through the body.

3. A signal comprising a support, an elongated inflatable body, said body being provided with a nipple at one end thereof to receive a fluid supply pipe, and a spring disposed longitudinally within the body, said spring consisting of a plate, and a pair of normally coiled and spaced arms projecting from the plate, and a tubular extension on said plate for disposition within said nipple.

In testimony whereof I affix my signature.

MERLE KNIGHT.